Jan. 14, 1969 G. W. LECK 3,421,938
METHOD OF FABRICATING IMPROVED SOLDERABLE LANDS
Filed Aug. 10, 1965

INVENTOR.
GEORGE W. LECK
BY
W. S. Hill
Agent

United States Patent Office 3,421,938
Patented Jan. 14, 1969

3,421,938
METHOD OF FABRICATING IMPROVED
SOLDERABLE LANDS
George W. Leck, Princeton Junction, N.J., assignor to Radio Corporation of America, a corporation of Delaware
Filed Aug. 10, 1965, Ser. No. 478,593
U.S. Cl. 117—217    4 Claims
Int. Cl. H01b *1/02;* C23b *5/50;* C23c *17/00*

ABSTRACT OF THE DISCLOSURE

This specification discloses a method of preparing a solderable land by vacuum deposition of manganese and tin from a single source.

---

Figure 1:
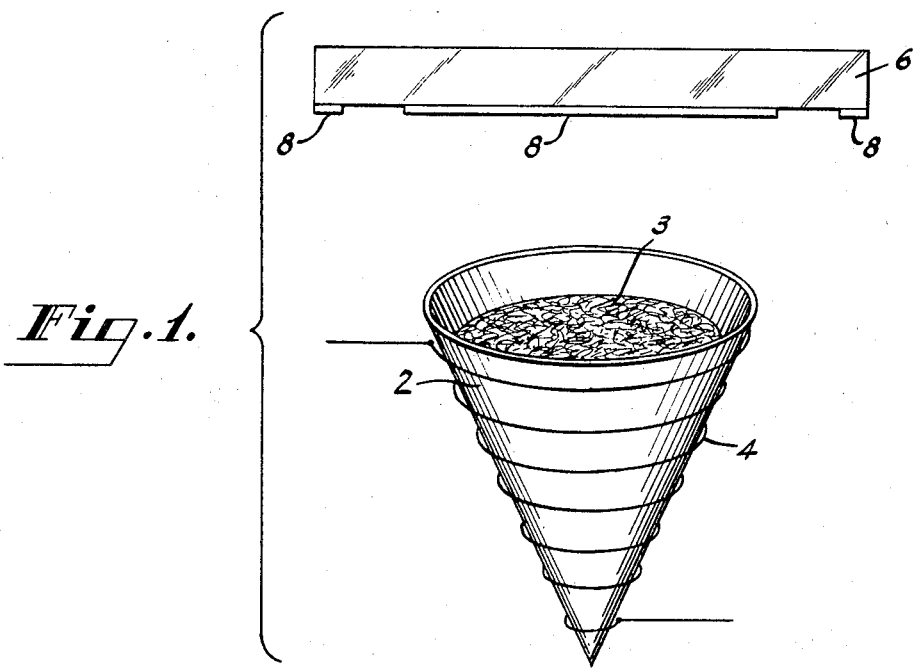

This invention relates to solderable lands for insulating materials which are difficult to solder to directly. More particularly, this invention relates to a method of fabricating solderable lands on a glass, ceramic, quartz or mica member to provide a surface for effecting a good adherence bond between an electrode and the member.

Metal-to-glass bonds with high adherence, under extreme conditions of temperature and pressure are always in demand, particularly in the cryogenic field. It has long been a problem to obtain lands which will solder easily and which have high adherence characteristics. A chief reason for this problem is that none of the metals which form oxides readily, and therefore adhere strongly to glass or a similar substrate, are easily solderable. Conversely, the metals which have desirable electrical and soldering properties do not adhere to the insulative material.

Recently, vapor-deposited alloys of metal have been used for the lands. One alloy which has been found suitable comprises a mixture of 20% manganese and 80% silver, by weight. The manganese adheres well to the glass while the silver, a good conductor, provides desirable soldering characteristics.

This technique presents definite objections. Flux is still required for satisfactory soldering of the lands. This flux is necessary so that solder will wet the surface of the land. However, flux is objectionable because it contaminates adjacent surfaces. A further objection is that it is difficult to cut or form the alloy ingots into convenient sized pellets for the vapor deposition process whereby the alloy is deposited on the insulative substrate. A further objection is that preparing the alloy is costly and time consuming.

It is therefore desirable to provide lands which are solderable without the use of a flux, and which produce metal-to-substrate bonds with high adherence characteristics.

Accordingly, an object of this invention is to provide lands on an insulating substrate comprising glass or similar material, which are easily solderable without the use of a flux.

Another object of this invention is to provide a more economical method for fabricating easily solderable lands on an insulative material such as glass, ceramic, quartz or mica.

Briefly, the method of the invention comprises vapor-depositing a mixture of manganese and tin on the substrate. The preferred mixture is 80% tin and 20% manganese by weight, but this ratio can be varied somewhat as will be pointed out later. No alloy need be prepared. Small pieces of manganese and pellets of tin are placed in a suitable container capable of withstanding the evaporation temperatures and non-reactive with the metals being evaporated. The container is heated to a temperature at which the manganese starts to evaporate. The manganese vapor is condensed onto the insulating substrate with excellent adhesion qualities. The container is further heated to a temperature at which the tin starts to evaporate. The tin vapor is then condensed onto the manganese deposit. The tin deposit insures a land surface which will solder well without the use of a flux. In practice, commercial indium-tin solder has been used to effect a very strong metal-to-glass bond at the land surface.

Figure 2:
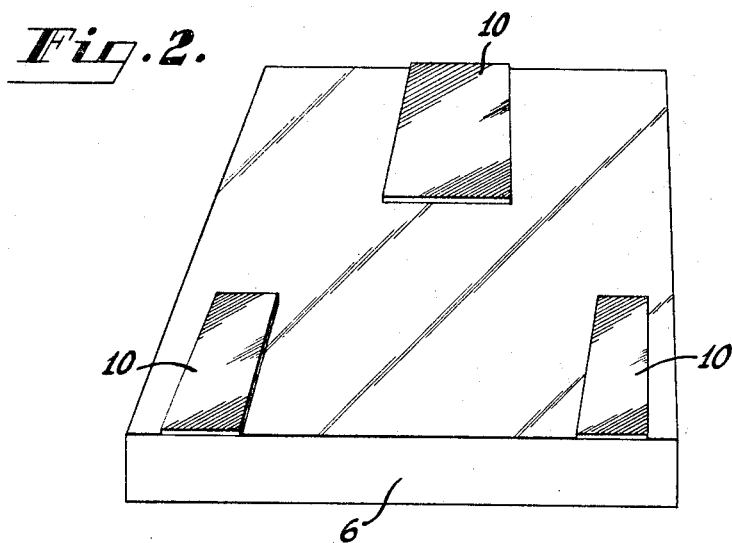

FIGURE 1 is a view, partially in perspective, of simple apparatus that may be used in carrying out the method of the present invention, and FIGURE 2 is a perspective view of an article in accordance with the invention.

Example

Referring now to FIG. 1, an alumina-coated basket 2 is provided for containing the mixture 3 to be evaporated. The basket 2 is contained within a supporting coil of resistance wire 4 connected to a power source (not shown). A mixture in the form of separate pieces of manganese and tin is placed in the basket. In this example, the mixture comprises 80% tin and 20% manganese by weight.

The basket with its heating coil is mounted within a conventional vacuum jar evaporation apparatus (not shown) and the vacuum jar is pumped down to a vacuum of about $10^{-5}$ mm. of mercury. A glass substrate 6 is also mounted in the vacuum chamber a short distance above the mouth of the basket 2. A removable mask 8 of a suitable material, for example, beryllium-copper alloy, is placed over the glass substrate with openings therein which correspond to the configuration of the lands to be deposited. Current is then passed through the coil of resistance wire 4 and, as the basket is heated, the tin melts and flows around the manganese pieces, affording good heat conduction to them. The tin begins to melt at approximately 232° C. As the temperature of the basket increases to approximately 680° C., the manganese begins to evaporate. Because of the sublimation characteristics of manganese, the manganese evaporates (680° C.), before it melts (1250° C.). The manganese vapor condenses onto the glass substrate 6 with excellent adhesion. When the temperature of the mixture reaches 890° C. the tin starts to evaporate. At this time practically all of the manganese has already evaporated. The final evaporation is practically pure tin. The tin vapor condenses onto the manganese deposit and insures a land surface 10 which is solderable without the use of a flux and which produces a strong glass-to-metal bond. The land surfaces 10 (FIG. 2) may have a thickness of about 5000 A., for example, but the thickness may be considerably more or less than this. It has been found that .005″ diameter copper wire soldered to the lands with an indium-tin solder without a flux breaks under tension before the land is damaged.

It will be understood that the above description is by way of illustration only and not by way of limitation. The mixture ratio of manganese and tin may be varied. The mixture may contain about 10% to 25% manganese by weight, balance tin. The vacuum should be at least about $10^{-5}$ mm. of mercury but may, of course, be higher. Various other modifications may be made by one having ordinary skill in the art without departing from the spirit and scope of the invention as described in the specification and appended claims.

What is claimed is:
1. A method of forming land surfaces on a glass, quartz, mica or ceramic substrate, comprising,
   (a) heating a mixture comprising manganese and tin to a temperature at which said manganese sublimates,
   (b) directing said manganese vapor onto said substrate to form a manganese deposit thereon,

(c) further heating said mixture to a higher temperature at which said tin evaporates, and (d) directing said tin vapor onto said manganese deposit.

2. A method of forming land surfaces as recited in claim 1 wherein said mixture comprises separate pieces of manganese and tin, the manganese being present in an amount between 10 and 25 percent by weight.

3. A method of forming land surfaces on a glass, quartz, mica, or ceramic substrate, in which manganese and subsequently tin are evaporated onto said substrate in a vacuum chamber, comprising placing a mixture of separate pieces of manganese and tin in an evaporation basket within said chamber, evacuating said chamber to a reduced pressure, heating said mixture to a temperature above the melting temperature of tin and above the sublimation temperature of manganese but below the evaporation temperature of tin, whereby manganese is evaporated from said mixture and condensed on said substrate, and further heating said mixture to a temperature above the evaporation temperature of tin, whereby tin is evaporated from said mixture and condensed on said substrate, the relative amounts of manganese and tin in said mixture being such that all the manganese is evaporated before all the tin is evaporated.

4. A method of forming land surfaces as recited in claim 3 wherein said mixture contains manganese in an amount between 10 and 25 percent by weight.

References Cited

UNITED STATES PATENTS

| 2,667,432 | 1/1954 | Nolte | 29—473.1 XR |
| 3,284,892 | 11/1966 | Wade | 117—114 XR |

FOREIGN PATENTS

| 930,667 | 7/1963 | Great Britain. |

OTHER REFERENCES

Holland, "Vacuum Deposition of the Films," 1956, John Wiley & Sons, p. 192 relied on.

WILLIAM L. JARVIS, *Primary Examiner.*

U.S. Cl. X.R.

117—212, 124; 29—198, 473, 492, 502, 504